Oct. 19, 1937.   S. FISCHER   2,096,355
DRIVING SYSTEM FOR MOTOR VEHICLES
Filed Jan. 23, 1936

INVENTOR
STEFAN FISCHER
BY Walter S. Bluestein
ATTORNEY

Patented Oct. 19, 1937

2,096,355

UNITED STATES PATENT OFFICE 2,096,355

DRIVING SYSTEM FOR MOTOR VEHICLES

Stefan Fischer, Prague, Czechoslovakia

Application January 23, 1936, Serial No. 60,398
In Czechoslovakia January 24, 1935

8 Claims. (Cl. 180—54)

The present invention refers to a driving system for motor vehicles particularly for streamlined cars in which the motor is arranged transversely to the longitudinal axis of the vehicle in its rear, and which are provided with driven swing axles.

The purpose of the invention is the provision of an absolutely safe driving system arranged in the rear of the vehicle and being capable of improving the qualities of operation of the vehicle.

A further purpose is the provision of a driving system which is unaffected by the action and reaction of the spring return forces and of the wheel shocks caused by the irregularities of the road, which furthermore is easily accessible and may be easily and speedily mounted in and disassembled from the vehicle, and which occupies as little space as possible.

The essence of the invention consists in that the motor, preferably of the multiple cylinder type, is arranged close behind the rear axle and substantially parallel to the vertical plane through the wheel centers, and that the motor so placed forms an organic unit with the change speed gear arranged in its prolongation or substantially parallel thereto, furthermore with the gearing of a lay shaft placed parallel to the motor axis for the transmission of power to the rear axle transmission, and with the rear axle transmission articulately connected with the swinging half shafts of the vehicle. This driving unit is mounted independently of the suspensions of the springs and of the wheels substantially on that part of a preferably underslung vehicle frame which is located in the rear of the frame portion carrying the mentioned suspensions.

The invention furthermore contemplates the provision of an overdrive built into the rear axle and adapted to be easily shifted in and out from the driver's seat in order to spare the motor at high speeds of the vehicle.

Further details will be apparent from the following description and the appended schematical drawing of embodiments of the invention.

Figure 1:
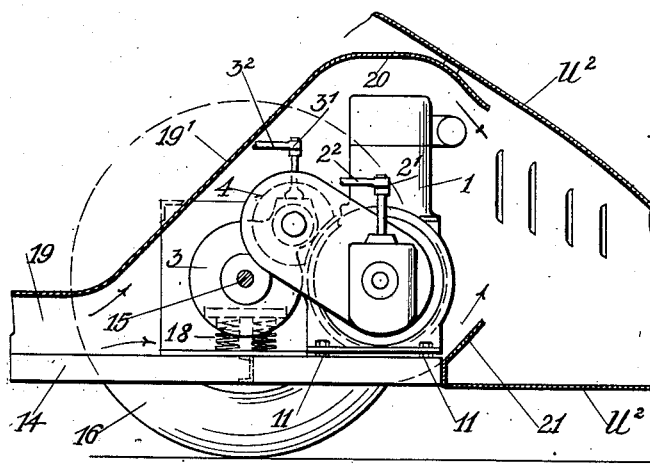
Fig. 1 is an elevation of a driving system with a multiple cylinder motor, according to the invention, arranged in the rear of a streamlined car, the body of the car being indicated only by its outlines, and the skeleton of the body being omitted for sake of greater clearness.
Figure 2:
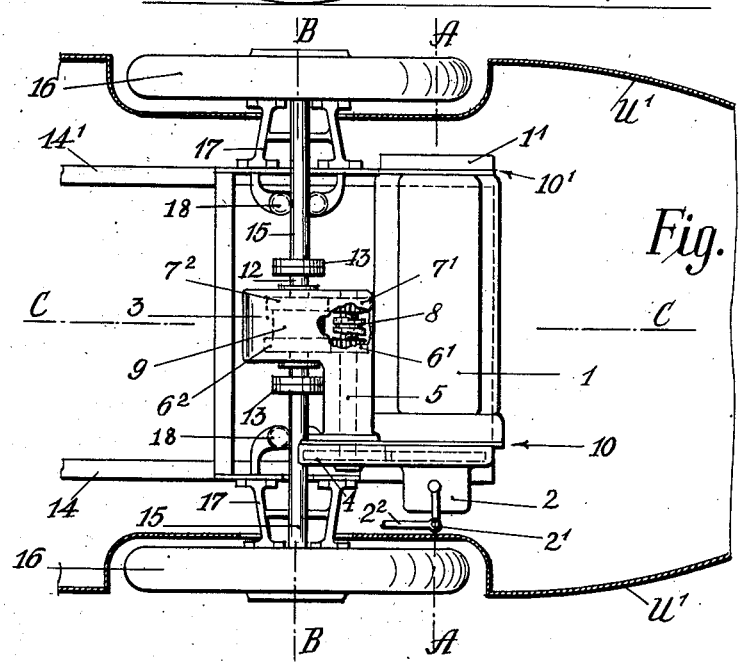
Fig. 2 is a plan view of the embodiment of Fig. 1, only the outlines of the streamlined body being illustrated.

In Figs. 1 and 2 the motor 1 is releasably connected to the change speed gear 2, for instance by means of screws. The change speed gear is arranged coaxially with the motor axis in the illustrated embodiment, and may be controlled from the driver's seat by means of lever $2^1$ and rod $2^2$. The motor and change speed gear unit is arranged with its axis A—A transversely, in the present case at a right angle to the longitudinal axis C—C of the vehicle. The rear axle transmission located in the rear axle casing 3 is driven by means of a gear wheel transmission 4 arranged at the change speed gear 2, and of a shaft 5 connected with transmission 4 and arranged parallel to the axis of the motor.

In the illustrated embodiment the rear axle transmission consists of two pinions $6^1$, $7^1$ loosely mounted on the shaft 5, and of two gears $6^2$, $7^2$ being in constant engagement with said pinions and secured on the differential gear 9. On their sides directed towards each other, the pinions $6^1$, $7^1$ are provided with dogs which may be alternatively engaged by the dog clutch 8 shiftable on feathers of the shaft 5 by means of a lever $3^1$ and rod $3^2$ operable from the driver's seat. The gears $6^1$, $6^2$, $7^1$, $7^2$ and the clutch 8 form what is known in the art as an "overdrive". The rear axle casing is so shaped, that not only the rear axle transmission $6^1$, $6^2$, $7^1$, $7^2$ but also the shaft 5 is enclosed therein, and the so formed prolongation of the casing is fastened to the bearing shield 10 to whose other side the change speed gear 2 and the casing of the transmission 4 are attached.

Bearing brackets or shields 10, $10^1$ formed of suitably strong metal sheets are fastened between the front surface of the motor 1 and that of the change speed gear 2 and of the casing for the transmission on the one hand, and between the opposite surface of the motor and the control casing $1^1$ containing the transmission for instance of the cam shaft on the other hand. The shields 10, $10^1$ are flanged and rest upon the longitudinal girders of the frame or upon parts connected therewith, elastic members 11 for instance springs, rubber blocks or the like being interposed therebetween. The shields, however, may be attached to any other suitable surfaces of the block 1, 2, 3.

The axle stubs 12 protruding from the rear axle casing 3 are connected with the swingable half shafts 15 by means of universal joints 13 or the like, which are jointed to the vehicle wheels 16. The axle bolt carriers (not shown) of the wheels 16 are articulately connected to the frame or its parts in a manner well known by means of for instance the bifurcated radious arms 17 forming an articulate parallelogram, and may be sprung in relation to the frame in any suitable manner for instance by means of the coil springs 18 indicated in Fig. 1.

In the arrangement according to the invention, the motor will be placed close to the rear axle casing particularly if the axis of the shaft 5 lies above or below the horizontal plane through the center axis of the driving shaft 12 while the motor axis may be arranged with respect to this plane as desired.

Figure 3:
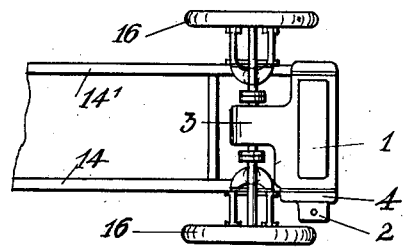
Fig. 3 shows another embodiment of a driving system according to the invention on a smaller scale, in which the differential gear casing and the motor casing form a unit.

Motor 1, change speed gear 2, transmission 4 and rear axle casing 3 thus form a unit. The casing 3 shown in the embodiment of Figs. 1 and 2 as separated from the motor, may be rigidly connected therewith, or it may form one piece with the motor as in the modification illustrated in Fig. 3, and which in other respects is similar to that described above.

After water and fuel pipes and electric cables as may be present have been disconnected, and after the fastenings at the frame 11 and at the universal joints 13 have been removed, the whole driving unit 1, 2, 3 may be taken out of the car. As apparent from Figs. 1 and 2, the driving unit 1, 2, 3 is arranged within the bordering surfaces $U^1$ and $U^2$ of the rear portion of the body. This body portion may be formed according to aerodynamic principles independently of the space required by the motor since this space will be always within the outlines of the body. Furthermore, the entire space in front of the canal wall $19^1$ may be used as luggage or passenger space.

The fastening of the driving unit 1, 2, 3 to the frame and the connection of the parts with each other are very solid. The points where the motor is fastened on the frame are so far away from the suspension of the wheels and the springs at the frame, that the wheel shocks and their reactions upon the frame and the driving unit, such as torsions, shaking and vibrations, will not be transmitted to the driving systems or only to a small extent.

When the vehicle equipped with the driving system of the invention starts the torque of the motor rotating in a counter-clockwise direction when looked at from the left hand side of the vehicle (Fig. 1) causes a reaction pressing the frame 14, $14^1$ downwardly with the wheels 16 against the road whereby the adhesion of the wheels to the road is increased, and consequently the starting improved.

The transverse arrangement of the motor closely behind the rear axle has as a consequence, that the moment of inertia in relation to the center of gravity of the vehicle is considerably smaller than that of the hitherto known arrangements with the longitudinal axis of the motor in the direction of the longitudinal axis of the vehicle where the center of gravity and rear end of the motor are rather far away from the rear axle and thus also from the center of gravity of the vehicle. The decrease of the moment of inertia of the driving mechanism considerably decreases the vibrations of the vehicle about its transverse horizontal and the vertical axes of inertia which vibrations are caused by the vertical and lateral shocks upon the wheels due to the irregularity of the road. Similarly, the moments occurring in curves due to the centrifugal force and tending to turn the vehicle portion behind the rear axle about the supporting points of the wheels on the road become considerably smaller as a consequence of the smaller distance of the center of gravity of the motor closely behind the rear axle from the latter. If the motor is transversely arranged, a particularly effective cooling system of the motor surface may be provided. The conventional radiator (not shown) may be mounted on the front part of the vehicle or at any other suitable place of the canal 19 extending within the vehicle in the direction of its longitudinal axis. The air flowing from this canal uniformly cools the motor cylinders, which are placed next to each other sideways, and may be so guided around the motor by means of lining or guiding panels such as 20 and 21 in Fig. 1, that the motor parts such as the cylinder heads, the lower motor casing, the exhaust etc., always are thoroughly and evenly cooled by the air compelled to pass their surfaces. Nevertheless, as it is apparent from Fig. 1, the air has still sufficient space to flow free of eddies to the discharge slots which may be arranged for instance in the side walls of the rear of the vehicle body.

Where in construction hitherto known the motor is arranged in the rear of the vehicle in the direction of its longitudinal axis, no such thorough cooling of the motor parts can be obtained, because the air passes the cylinders one after the other, or a repeated change of direction is required which causes eddies and considerable loss of pressure.

Instead of being arranged in the prolongation of the motor, the change speed gear may also be arranged at the side of the motor and substantially parallel thereto.

It is advantageous to build the rear axle transmission as an over-drive whereby the transmission of power always takes place over only one or at most two pairs of gears when the change speed gear is in the direct drive. Contrary thereto, over-drives of the kind and arrangement hitherto known require at least the engagement of three pairs of gears when the power is transmitted therethrough.

It is of no importance with regards to the present invention whether a petrol, Diesel, oil or gas motor or an electric motor is used as a power source. Instead of the wheel gears 3, 4, other suitable transmissions may be employed as for instance hydraulic or electric transmissions, and transmission 2 may be either a gear wheel or a chain transmission.

I claim:

1. In a motor vehicle having rear swing axles and a frame with spring suspensions and with wheel suspensions attached thereto, a driving system comprising in combination a motor, a change speed gear, a lay shaft, the axes of said motor, said change speed gear, and said lay shaft being arranged transversely to the longitudinal axis of the vehicle, a rear axle transmission, first means for transmitting power from said change speed gear to said lay shaft, second means for transmitting power from said lay shaft to said rear axle transmission, and means for articulately coupling the rear swing axles with said rear axle transmission, said motor, said change speed gear, said lay shaft, said rear axle transmission, both said power transmitting means and said coupling means being constructed as a unit and mounted, independently of the spring suspensions and the wheel suspensions, on the portion of the vehicle frame in the rear of the frame portion to which the spring suspensions and wheel suspensions are attached.

2. In a motor vehicle having rear swing axles and an underslung frame with spring suspensions and wheel suspensions attached thereto, a driving system comprising in combination a motor arranged transversely to the longitudinal axis of the vehicle, a change speed gear arranged in the prolongation of said motor, a lay shaft in parallel arrangement to said motor, a rear axle transmission, means for transmitting power from said change speed gear to said lay shaft, second means for transmitting power from said lay shaft to said rear axle transmission, and means for articulately coupling the rear swing axles with said rear axle transmission, said motor, said change speed gear, said lay shaft, said rear axle transmission, both said power transmitting means and said coupling means being constructed as a unit and mounted, independently of the spring suspensions and the wheel suspensions substantially on the underslung frame portion in the rear of the spring suspensions and wheel suspensions.

3. In a motor vehicle having rear swing axles and a frame with spring suspensions and with wheel suspensions attached thereto, a driving system comprising in combination a motor arranged transversely to the longitudinal axis of the vehicle, a rear axle transmission, means for transmitting power from said motor to said rear axle transmission, two supporting shields each secured to one end of said motor, said rear axle transmission and said power transmission means being in rigid connection with said supporting shields, said supporting shields being mounted on the vehicle frame in the rear of the spring suspensions and the wheel suspensions, and elastic members interposed between said shields and said frame.

4. In a motor vehicle having rear swing axles and a frame with spring suspensions and with wheel suspensions attached thereto, a driving system comprising in combination a motor, a change sped gear, a lay shaft, the axes of said motor, said change speed gear, and said lay shaft arranged transversely to the longitudinal axis of the vehicle, a rear axle transmission, a casing with a gear wheel set for transmitting power from said change speed gear to said lay shaft, means for transmitting power from said lay shaft to said rear axle transmission, two supporting means each secured to one end of said motor, said change speed gear, said gear wheel casing and said power transmitting means being attached to one of said supporting means, and said rear axle transmission being in rigid connection with said power transmitting means, and means for articulately coupling the rear swing axles with said rear axle transmission, said motor, said change speed gear, said lay shaft, said gear wheel casing, said rear axle transmission, said power transmitting means, said supporting means and said coupling means being so constructed as to form a unit, and said supporting means being mounted on the vehicle frame in the rear of the spring suspensions and the wheel suspensions independently thereof.

5. In a motor vehicle having rear swing axles and a frame with spring suspensions and with wheel suspensions attached thereto, a driving system comprising in combination a motor arranged transversely to the longitudinal axis of the vehicle, a change speed gear arranged in prolongation of said motor, a rear axle transmission, means for transmitting power from said change speed gear to said rear axle transmission, two bearing shields, each at one end of said motor, one of said shields being interposed between and fastened to said motor and said change speed gear, and said rear axle transmission being rigidly connected with at least one of said shields, said shields being mounted on the vehicle frame in the rear of the spring suspensions and the wheel suspensions.

6. In a motor vehicle having rear swing axles and a frame with spring suspensions and with wheel suspensions attached thereto, a driving system comprising in combination a motor arranged transversely to the longitudinal axis of the vehicle, a change speed gear arranged in prolongation of said motor, a rear axle transmission, means for transmitting power from said change speed gear to said rear axle transmission, two bearing shields, each at one end of said motor, one of said shields being interposed between and fastened to said motor and said change speed gear, and said rear axle transmission being rigidly connected with said motor, said shield being mounted on the vehicle frame in the rear of the spring suspensions and the wheel suspensions.

7. In a motor vehicle having rear swing axles and a frame with spring suspensions and with wheel suspensions attached thereto, a driving system comprising in combination a motor arranged transversely to the longitudinal axis of the vehicle, a motor control casing, a change speed gear arranged in prolongation of said motor, a rear axle transmission, means for transmitting power from said change speed gear to said rear axle transmission, two bearing shields, each at one end of said motor, one of said shields being interposed between and fastened to said motor and said change speed gear, said other shield being interposed between and fastened to said motor and said motor control casing, and said rear axle transmission being rigidly connected with at least one of said shields, said shields being mounted on the vehicle frame in the rear of the spring suspensions and the wheel suspensions.

8. In a motor vehicle having rear swing axles and a frame with spring suspensions and with wheel suspensions attached thereto, a driving system comprising in combination a motor, a change speed gear, a lay shaft, the axes of said motor, said change speed gear, and said lay shaft being arranged transversely to the longitudinal axis of the vehicle, a differential including two driving shafts and two gears adapted to be driven, said driving shafts and said two gears having a common axis parallel to the axis of said lay shaft but on a level differing from that of the lay shaft axis, two pinions in mesh with said two gears respectively, said pinions being mounted on said lay shaft so as to freely rotate thereon, operable coupling means for alternatively coupling the one and the other of said pinions with said lay shaft, whereby said pinions, said two gears and said coupling means form an overdrive, means for transmitting power from said change speed gear to said lay shaft, and means for transmitting power from said driving shafts to said swing axles; said motor, said change speed gear, said lay shaft, said differential, said overdrive, and both said power transmitting means being constructed as a unit and mounted, independently of the spring suspensions and the wheel suspensions, on the portion of the vehicle frame in the rear of the frame portion to which the spring suspensions and wheel suspensions are attached.

STEFAN FISCHER.